Sept. 28, 1948. L. N. VANDERVOORT 2,450,314
COUPLING FOR FLARELESS TUBES
Filed July 5, 1944
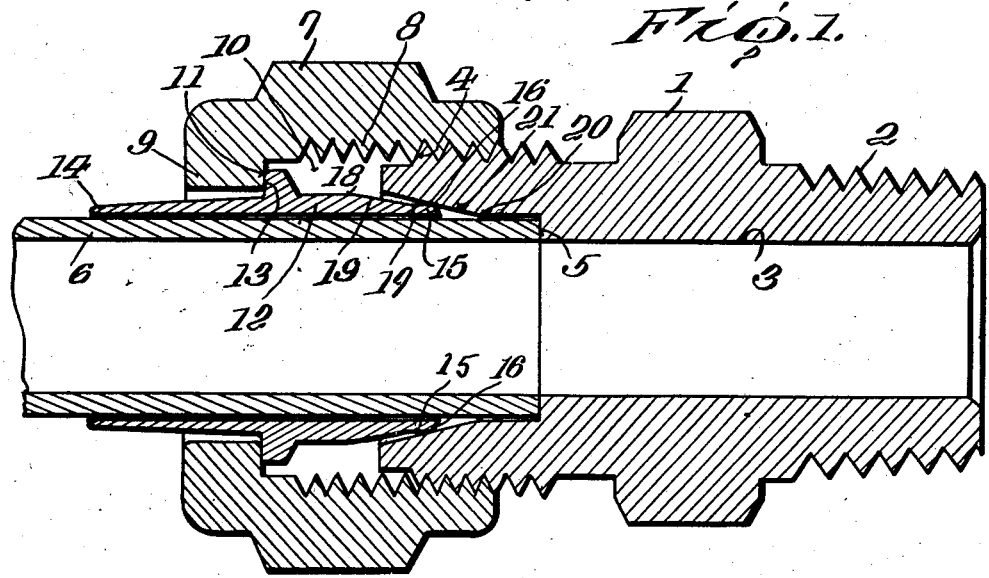
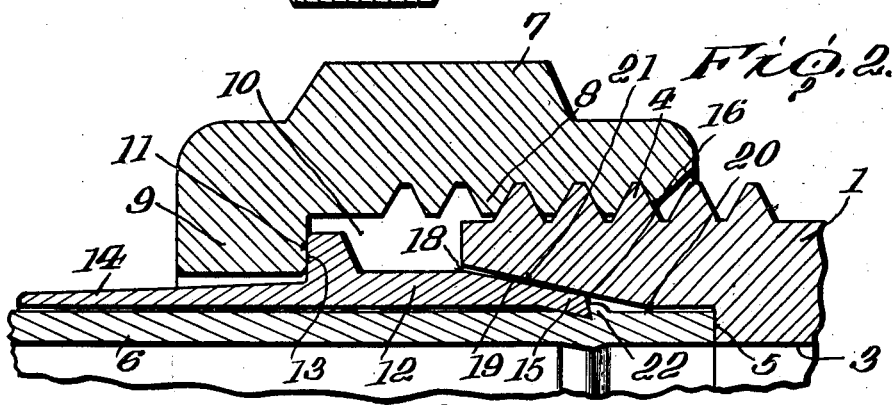
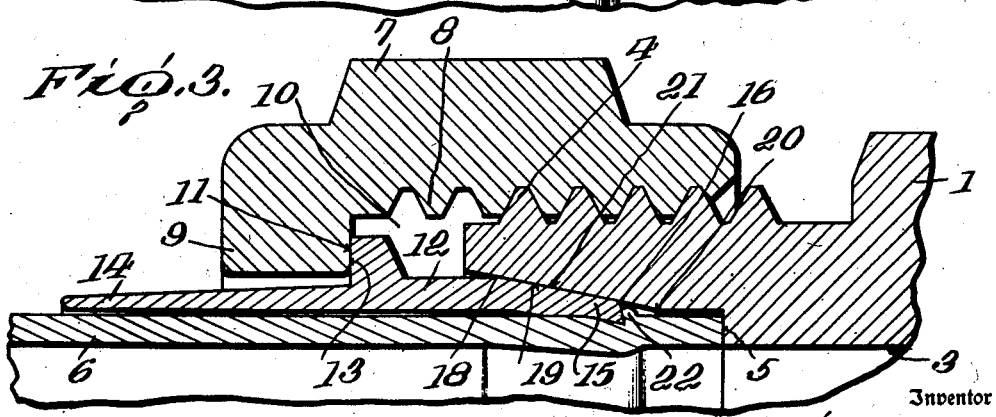
Inventor
Lorain N. Vandervoort
By
Mason, Porter and Diller
Attorneys Patented Sept. 28, 1948

2,450,314

UNITED STATES PATENT OFFICE 2,450,314

COUPLING FOR FLARELESS TUBES

Lorain N. Vandervoort, Cleveland, Ohio, assignor to The Parker Appliance Company, Cleveland, Ohio, a corporation of Ohio Application July 5, 1944, Serial No. 543,553

1 Claim. (Cl. 285—122)

The invention has to do with a coupling for tubes and more particularly a coupling for flareless tubes.

An object of the invention is to provide a coupling for flareless tubes having a holding sleeve moved into gripping engagement with the tube by a camming surface on the body member wherein said camming surface and sleeve are so shaped and dimensioned that when the sleeve is moved endwise into contact with the camming surface the advanced end of the sleeve will be contracted and caused to bite into the tube after which the sleeve rearwardly of the gripping end will be contracted into engagement with the tube so as to provide a gradually releasing grip extending from the gripping end of the sleeve for a considerable distance over the tube length for resisting vibrations in the tube.

In the drawings which show by way of illustration one embodiment of the invention, Figure 1 is a longitudinal sectional view through a coupling with the tube to be gripped in place and the coupling parts in their initial assembled position.

Figure 2 is a similar view of a portion of the coupling showing the sleeve as having been moved endwise into engagement with the camming surface on the body member sufficiently to cause the advanced end of the sleeve to bite into and grip the tube.

Figure 3 is a view showing the coupling parts fully assembled with the sleeve end biting into the tube and also contracted into engagement with the tube from the cut end rearwardly along the tube so as to provide a gradually releasing grip of the sleeve on the tube.

The improved coupling includes a body member 1 having a threaded portion 2 which is adapted to be secured to any member to which the tube is to be attached. This body member is provided with a bore 3 which is of a diameter substantially like that of the tube which is clamped to the body member. The body member is provided with a thread 4. The body member 1 is counterbored so as to provide a seat 5 for the end of the tube which is indicated at 6.

The coupling also includes a nut 7 having a threaded portion 8 adapted to cooperate with the threaded portion 4 on the body member. While the threaded portion 4 on the body member is an external thread it will be understood that the threaded connection between the nut and the body member may be otherwise formed, it being essential however that the connection shall be such that when the nut is turned it will be moved onto the body member 1. The nut is provided with an inwardly projecting portion 9 at its rear end forming a recess 10 and a shoulder 11.

Disposed within the nut 7 is a sleeve 12. Said sleeve 12 is formed with a shoulder 13 which is adapted to be contacted with by the shoulder 11 so that when the nut is turned onto the body member the sleeve will be forced endwise into the body member. Said sleeve 12 has a rearward extension 14 which projects beyond the outer end of the nut and is free from engagement by the nut. This extension fits the tube with very slight clearance so that the extension serves to dampen vibrations imparted to the tube.

The sleeve 12 at its inner end is reduced so as to provide a cylindrical portion 15 terminating in an end 16 shaped so as to provide a cutting edge. This cylindrical portion is relatively short. The sleeve is provided with a tapered portion extending from the point 17 to the point 18 and this tapered portion is indicated by the numeral 19.

The body member 1 from the point 20 to the outer end of the bore is tapered outwardly and this tapered surface 21 serves as a camming surface for contracting the advanced end of the sleeve.

The tube to be clamped is inserted in the coupling with the end thereof in contact with the seat 5. The sleeve and the nut are however first placed on the tube. After the tube has been positioned in the body member then the nut is threaded onto the body member as shown in Figure 1. Further turning movement of the nut will force the sleeve along the camming surface 21 of the body member and this will cause the inner end of the sleeve to be contracted as shown in Figure 2. The contracting of the sleeve as it advances will cause the cutting edge to bite into the tube and roll up a holding shoulder 22 as shown in Figures 2 and 3. The tapered surface 19 is of slightly less taper than the camming surface 21 and it is initially spaced away from the camming surface when the advanced end of the sleeve first contacts with said camming surface.

After the sleeve has made its firm grip on the tube as shown in Figure 2 further endwise movement of the sleeve will bring the tapered surface 19 into contact with the tapered camming surface 21. The tapered surface 19 as noted above is of slightly less taper than the camming surface 21. When the coupling is fully closed the portion of the sleeve in the region of the tapered surface 19 will be contracted. It will be gradually contracted from the inner end outward and this will produce a contact between the sleeve and the tube which is a gradually releasing grip extending all the way from the gripping end of the sleeve for a considerable distance along the tube length. This provides vibration resistance without having to sacrifice any grip of the sharp deep cutting action at the end of the sleeve necessary to effect a strong firm grip on the tube. The imbedding of the end of the sleeve in the tube to provide this grip is first accomplished after which the sleeve in rear of this cylindrical end is contracted into firm resisting contact with the tube.

Furthermore when the tapered surface 19 contacts with the camming surface and the sleeve in the region of this tapered surface is contracted, a heavier turning torque is necessary and this serves as a warning to the operator to cease tightening while the contact between this camming surface and the tapered portion 19 serves in a measure as a stop to prevent over-tightness with resulting deformation or crushing of the tube. It will at the same time yield under heavy turning torque applied to the nut so as to take up any looseness between the cutting edge and the shoulder on the tube in event of the tube loosening from vibration or tensile strains.

In order to easily slip the sleeve onto the tube, there is necessarily a slight clearance to account for tolerance variations in tube diameter and the inside diameter of the sleeve. This tight grip of the sleeve on the tube in the region of the inner end of the sleeve dampens vibrations of the tube within the sleeve. The long tapered extension 18 is effective in resisting vibrations of a magnitude greater than the slight clearance between the sleeve and the tube.

It is obvious that minor changes in the details of construction and the shaping of the parts may be made without departing from the spirit of the invention as set forth in the appended claim.

I claim:

A coupling for tubes comprising a body member having a bore adapted to receive the end of a flareless tube, a nut having threated engagement with said body member and having a shoulder adjacent the outer end thereof, a clamping sleeve disposed within the nut and having a shoulder for engagement with the shoulder on the nut, said sleeve initially having throughout its length a slip-fit clearance with the tube, said body member at the outer end portion of the bore being provided with a relatively long tapered camming surface, said sleeve at the inner end thereof having a relatively thin cylindrical portion and a tapered portion immediately in rear of the cylindrical portion, said cylindrical and tapered portions of the sleeve and the tapered camming surface on the body member being dimensioned and positioned whereby endwise movement of the sleeve into engagement with the camming surface will cause the inner end of the sleeve to be contracted and to cut into the tube for gripping the same after which the sleeve in the region of the tapered surface will engage the tapered camming surface on the body member and be contracted into engagement with the uncut portion of the tube immediately behind the cut portion so as to provide a gradually releasing grip extending from the cut portion of the tube for a considerable distance over the tube length for arresting vibrations in the tube at a point spaced outwardly from the cut portion of the tube, the slip-fit clearance at the rear portion of the sleeve retaining its initial condition.

LORAIN N. VANDERVOORT.

REFERENCES CITED

The following references are of record in the file of this patent:

UNITED STATES PATENTS

| Number | Name | Date |
|---|---|---|
| 1,866,914 | Stover | July 12, 1932 |
| 2,182,811 | Kocher | Dec. 12, 1939 |
| 2,201,404 | Kreidel | May 21, 1940 |

FOREIGN PATENTS

| Number | Country | Date |
|---|---|---|
| 569,953 | France | Jan. 12, 1924 |